US008847852B2

United States Patent
Hsiao et al.

(10) Patent No.: US 8,847,852 B2
(45) Date of Patent: Sep. 30, 2014

(54) STEREOSCOPIC DISPLAY DEVICE AND CONTROL METHOD THEREOF

(75) Inventors: Chia-Chiang Hsiao, Shenzhen (CN); Chih-Wen Chen, Shenzhen (CN); Chengming He, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 457 days.

(21) Appl. No.: 13/379,646

(22) PCT Filed: Aug. 8, 2011

(86) PCT No.: PCT/CN2011/078126
§ 371 (c)(1),
(2), (4) Date: Dec. 20, 2011

(87) PCT Pub. No.: WO2013/013422
PCT Pub. Date: Jan. 31, 2013

(65) Prior Publication Data
US 2013/0027387 A1    Jan. 31, 2013

(51) Int. Cl.
G09G 5/00 (2006.01)
G09G 3/36 (2006.01)
G03H 1/00 (2006.01)
G02F 1/1335 (2006.01)
H04N 13/04 (2006.01)

(52) U.S. Cl.
CPC ....... H04N 13/0497 (2013.01); H04N 13/0438 (2013.01)
USPC ............. 345/8; 345/7; 345/103; 345/102; 359/13; 349/11

(58) Field of Classification Search
CPC ......... G09G 3/003; G09G 3/36; G09G 3/342; G09G 3/3648; G09G 3/3666; G02B 27/27017
USPC .......... 345/7–8, 87, 102–103; 359/13; 349/11
See application file for complete search history.

(56) References Cited

U.S. PATENT DOCUMENTS

| 5,825,340 A * | 10/1998 | Torizuka et al. ............. 345/8 |
| 2010/0238274 A1* | 9/2010 | Kim et al. .............. 348/51 |
| 2011/0292041 A1* | 12/2011 | Lee et al. ............. 345/419 |
| 2012/0001956 A1* | 1/2012 | Sato ................. 345/690 |

FOREIGN PATENT DOCUMENTS

| CN | 101841729 A | 9/2010 |
| CN | 101960506 A | 1/2011 |
| CN | 101963704 A | 2/2011 |
| CN | 102055993 A | 5/2011 |
| CN | 102104787 A | 6/2011 |

* cited by examiner

Primary Examiner — Lun-Yi Lao
Assistant Examiner — Jarurat Suteerawongsa
(74) Attorney, Agent, or Firm — Cheng-Ju Chiang

(57) ABSTRACT

A stereoscopic display device and a control method thereof are disclosed. A liquid crystal display (LCD) panel of the stereoscopic display device is configured to display left-eye frames and right-eye frames alternately. Each of the left-eye frames includes a left-eye sub-frame and a black sub-frame that are displayed by a first display region and a second display region alternatively. Each of the right-eye frames includes a right-eye sub-frame and a black sub-frame that are displayed by the first display region and the second display region alternately. The backlight module includes a first backlight and a second backlight. The first backlight and the second backlight are turned on alternately in such a way that the first backlight illuminates the first display region when the first display region displays one of the left-eye sub-frames and the right-eye sub-frames and the second backlight illuminates the second display region when the second display region displays one of the left-eye sub-frames and the right-eye sub-frames. In this way, uniformity in brightness of the stereoscopic display device can be improved.

12 Claims, 6 Drawing Sheets

STEREOSCOPIC DISPLAY DEVICE AND CONTROL METHOD THEREOF

FIELD OF THE INVENTION

The present disclosure generally relates to the technical field of displaying, and more particularly, to a stereoscopic display device and a control method thereof.

BACKGROUND OF THE INVENTION

In recent years, stereoscopic displaying technologies have been developed quickly and become a focus of research. The stereoscopic display technologies play an important role in fields of medical care, advertisement, military affairs, exhibition, games and the like. FIG. 1 shows a schematic view of a prior art stereoscopic display device. As shown in FIG. 1, the stereoscopic display device mainly includes a liquid crystal display (LCD) 10 and a pair of shutter glasses 13. The LCD 10 mainly includes an LCD panel 11 and a backlight module 12. The LCD panel 11 can display left-eye images and right-eye images alternately as being illuminated by the backlight module 12.

The pair of shutter glasses 13 includes a left-eye glass 131 and a right-eye glass 132. Each of the left-eye glass 131 and the right-eye glass 132 includes two polarizers (not shown) and a liquid crystal layer (not shown) interposed between the two polarizers. By applying voltages to respective liquid crystal layers, the left-eye glass 131 and the right-eye glass 132 can be controlled to be turned on and off, respectively. During the stereoscopic displaying, when the LCD panel 11 displays a left-eye image, the left-eye glass 131 is turned on and the right-eye glass 132 is turned off. In this case, the left-eye image is transmitted to the user's left eye while the right eye views a black image. Conversely, when the LCD panel 11 displays a right-eye image, the left-eye glass 131 is turned off and the right-eye glass 132 is turned on. In this case, the right-eye image is transmitted to the user's right eye while the left eye views a black image. Then, the left-eye image and the right-eye image received respectively by the left eye and the right eye of the user are combined to form a stereoscopic image in the user's brain, thus resulting in a stereoscopic displaying effect. However, because the LCD panel 11 has a response time to the images, a previous image might be seen during switching between the left-eye glass 131 and the right-eye glass 132; and consequently, an erroneous image might be received by the user to cause crosstalk, which has an adverse effect on the stereoscopic displaying effect.

FIG. 2 shows an operational timing diagram of the stereoscopic displaying device shown in FIG. 1. As shown in FIG. 2, to solve the problem of crosstalk between the left-eye image and the right-eye image, a black image is further interposed between the left-eye image and the right-eye image in the prior art stereoscopic display device described above. The left-eye image L, the black image B, the right-eye image R, the black image B and so on are transmitted to the LCD panel 11 of the LCD 10 successively through a scanning way and are displayed by the LCD panel 11 successively from top to bottom.

Additionally, in the prior art stereoscopic display device described above, the backlight module 12 is further divided into an upper backlight region 121 and a lower backlight region 122 as shown in FIG. 1. The upper backlight region 121 and the lower backlight region 122 are turned on alternately according to the content displayed by the LCD panel 11. Specifically, in order to overcome the delay caused by liquid crystal molecules of the LCD panel 11, the upper backlight region 121 is turned on when image data of an upper half image of the left-eye image L or the right-eye image R has been transmitted to the LCD panel 11 (i.e., when the image data of the left-eye image L or the right-eye image R has been transmitted for a duration of a half frame), and is turned off when the image data of the whole left-eye image L or the whole right-eye image R has been totally transmitted to the LCD panel 11 (i.e., when the image data of the left-eye image L or the right-eye image R has been transmitted for a duration of a whole frame). On the other hand, the lower backlight region 122 is turned on when the image data of the whole left-eye image L or the whole right-image R has been totally transmitted to the LCD panel 11, and keeps being turned on for a time interval equal to the turning-on time interval of the upper backlight region 121 before being turned off.

The left-eye glass 131 is turned on when the LCD panel 11 displays the left-eye image L and the upper backlight region 121 is turned on, and is turned off after a duration of two frames. The right-eye glass 132 is turned on when the LCD panel 11 displays the right-eye image R and the upper backlight region 121 is turned on, and is turned off after a duration of also two frames. As a result, the left-eye image L displayed by the LCD panel 11 is transmitted to the user's left eye through the left-eye glass 131, and the right-eye image R displayed by the LCD panel 11 is transmitted to the user's right eye through the right-eye glass 132.

In this way, by turning on the upper backlight region 121 and the lower backlight region 122 alternately and keeping the lower backlight region 122 turned off during the switching between the right-eye glass 132 and the left-eye glass 131, the problem that, due to the delay caused by liquid crystal molecules of the LCD panel 11, a previous right-eye image R or left-eye image L is transmitted to the user's left eye or right eye through the left-eye glass 131 or the right-eye glass 132 to cause crosstalk is solved.

However, when the image data of the upper half image of the left-eye image L or the right-eye image R has been transmitted to the LCD panel 11 in the prior art stereoscopic display device described above, the upper backlight region 121 is turned on, so the light emitted by the upper backlight region 121 may be transmitted to a lower middle region of the LCD panel 11; and when the image data of the whole left-eye image L or the whole right-eye image R has been transmitted to the LCD panel 11, the lower backlight region 122 is turned on, so the light emitted by the lower backlight region 122 may be transmitted to an upper middle region of the LCD panel 11. This makes brightness of the middle region of the LCD panel 11 perceived by the user's eyes greater than that of the upper region and the lower region of the LCD panel 11, thus leading to non-uniformity in brightness of the image displayed by the stereoscopic display device.

Accordingly, a need exists in the art to provide a stereoscopic display device and a control method thereof that can solve the aforesaid problems.

SUMMARY OF THE INVENTION

A primary objective of the present disclosure is to provide a stereoscopic display device and a control method thereof that can improve the user's experience by improving the uniformity in brightness of the stereoscopic display device.

To achieve this objective, the present disclosure provides a stereoscopic display device, which includes:

a liquid crystal display (LCD) panel configured to display left-eye frames and right-eye frames alternately, wherein the LCD panel includes a first display region and a second display region, the left-eye frames each include a left-eye sub-frame displayed by one of the first display region and the second display region and a black sub-frame displayed by the other of the first display region and the second display region, the left-eye sub-frames are displayed by the first display region and the second display region alternately, and one of the left-eye sub-frames displayed by the first display region and a corresponding one of the left-eye sub-frames displayed by the second display region form a left-eye image, and wherein the right-eye frames each include a right-eye sub-frame displayed by one of the first display region and the second display region and the black sub-frame displayed by the other of the first display region and the second display region, the right-eye sub-frames are displayed by the first display region and the second display region alternately, and one of the right-eye sub-frames displayed by the first display region and a corresponding one of the right-eye sub-frames displayed by the second display region form a right-eye image;

a backlight module including a first backlight and a second backlight, wherein the first backlight and the second backlight are turned on alternately in such a way that the first backlight illuminates the first display region when the first display region displays one of the left-eye sub-frames and one of the right-eye sub-frames and the second backlight illuminates the second display region when the second display region displays one of the left-eye sub-frames and one of the right-eye sub-frames; and a pair of shutter glasses including a left-eye glass and a right-eye glass, wherein the left-eye glass and the right-eye glass are turned on alternately to transmit the left-eye frames and the right-eye frames alternately, wherein the left-eye frames include a first left-eye frame and a second left-eye frame, the first left-eye frame includes the black sub-frame displayed by the first display region and the left-eye sub-frame displayed by the second display region, the second left-eye frame includes the left-eye sub-frame displayed by the first display region and the black sub-frame displayed by the second display region, the right-eye frames include a first right-eye frame and a second right-eye frame, the first right-eye frame includes the black sub-frame displayed by the first display region and the right-eye sub-frame displayed by the second display region, and the second right-eye frame includes the right-eye sub-frame displayed by the first display region and the black sub-frame displayed by the second display region.

According to a preferred embodiment of the present disclosure, the left-eye frames and the right-eye frames are transmitted to the LCD panel successively through a scanning way, the first backlight is turned on with a delay of a first predetermined time after one of the left-eye sub-frames or one of the right-eye sub-frames has been totally transmitted to the first display region, and is turned off with a delay of the first predetermined time after a next sub-frame adjacent to one of the left-eye sub-frames or one of the right-eye sub-frames has been totally transmitted to the second display region, the second backlight is turned on with a delay of a second predetermined time after one of the left-eye sub-frames or one of the right-eye sub-frames has been totally transmitted to the second display region, and is turned off with a delay of the second predetermined time after a next sub-frame adjacent to one of the left-eye sub-frames or one of the right-eye sub-frames has been totally transmitted to the first display region, and the first predetermined time and the second predetermined time range between 2 milliseconds (ms) and 6 ms.

To achieve the aforesaid objective, the present disclosure also provides a stereoscopic display device, including:

an LCD panel configured to display left-eye frames and right-eye frames alternately, wherein the LCD panel includes a first display region and a second display region, the left-eye frames each include a left-eye sub-frame displayed by one of the first display region and the second display region and a black sub-frame displayed by the other of the first display region and the second display region, the left-eye sub-frames are displayed by the first display region and the second display region alternately, and one of the left-eye sub-frames displayed by the first display region and a corresponding one of the left-eye sub-frames displayed by the second display region form a left-eye image, and wherein the right-eye frames each include a right-eye sub-frame displayed by one of the first display region and the second display region and the black sub-frame displayed by the other of the first display region and the second display region, the right-eye sub-frames are displayed by the first display region and the second display region alternately, and one of the right-eye sub-frames displayed by the first display region and a corresponding one of the right-eye sub-frames displayed by the second display region form a right-eye image; and a backlight module including a first backlight and a second backlight, wherein the first backlight and the second backlight are turned on alternately in such a way that the first backlight illuminates the first display region when the first display region displays one of the left-eye sub-frames and one of the right-eye sub-frames and the second backlight illuminates the second display region when the second display region displays one of the left-eye sub-frames and one of the right-eye sub-frames.

According to a preferred embodiment of the present disclosure, the left-eye frames and the right-eye frames are transmitted to the LCD panel successively through a scanning way, the first backlight is turned on when one of the left-eye sub-frames or one of the right-eye sub-frames has been totally transmitted to the first display region, and is turned off when a next sub-frame adjacent to one of the left-eye sub-frames or one of the right-eye sub-frames has been totally transmitted to the second display region, and the second backlight is turned on when one of the left-eye sub-frames or one of the right-eye sub-frames has been totally transmitted to the second display region, and is turned off when a next sub-frame adjacent to one of the left-eye sub-frames or one of the right-eye sub-frames has been totally transmitted to the first display region.

According to a preferred embodiment of the present disclosure, the left-eye frames and the right-eye frames are transmitted to the LCD panel successively through a scanning way, the first backlight is turned on with a delay of a first predetermined time after one of the left-eye sub-frames or one of the right-eye sub-frames has been totally transmitted to the first display region, and is turned off with a delay of the first predetermined time after a next sub-frame adjacent to one of the left-eye sub-frames or one of the right-eye sub-frames has been totally transmitted to the second display region, the second backlight is turned on with a delay of a second predetermined time after one of the left-eye sub-frames or one of the right-eye sub-frames has been totally transmitted to the second display region, and is turned off with a delay of the second predetermined time after a next sub-frame adjacent to one of the left-eye sub-frames or one of the right-eye sub-frames has been totally transmitted to the first display region, and the first predetermined time and the second predetermined time range between 2 ms and 6 ms.

According to a preferred embodiment of the present disclosure, the stereoscopic display device further includes a pair of shutter glasses including a left-eye glass and a right-eye glass, wherein the left-eye glass and the right-eye glass are turned on alternately to transmit the left-eye frames and the right-eye frames alternately.

According to a preferred embodiment of the present disclosure, the left-eye glass is turned on when the LCD panel displays one of the left-eye frames and the second backlight is turned on, and is turned off when the LCD panel displays one of the right-eye frames and the second backlight is turned on, and the right-eye glass is turned on when the LCD panel displays one of the right-eye frames and the second backlight is turned on, and is turned off when the LCD panel displays one of the left-eye frames and the second backlight is turned on.

According to a preferred embodiment of the present disclosure, the left-eye frames include a first left-eye frame and a second left-eye frame, the first left-eye frame includes the black sub-frame displayed by the first display region and the left-eye sub-frame displayed by the second display region, the second left-eye frame includes the left-eye sub-frame displayed by the first display region and the black sub-frame displayed by the second display region, the right-eye frames include a first right-eye frame and a second right-eye frame, the first right-eye frame includes the black sub-frame displayed by the first display region and the right-eye sub-frame displayed by the second display region, and the second right-eye frame includes the right-eye sub-frame displayed by the first display region and the black sub-frame displayed by the second display region.

To achieve the aforesaid objective, the present disclosure further provides a control method of a stereoscopic display device, including the following steps of:

controlling an LCD panel to display left-eye frames and right-eye frames alternately, wherein the LCD panel includes a first display region and a second display region, the left-eye frames each include a left-eye sub-frame displayed by one of the first display region and the second display region and a black sub-frame displayed by the other of the first display region and the second display region, the left-eye sub-frames are displayed by the first display region and the second display region alternately, and one of the left-eye sub-frames displayed by the first display region and a corresponding one of the left-eye sub-frames displayed by the second display region form a left-eye image, and wherein the right-eye frames each include a right-eye sub-frame displayed by one of the first display region and the second display region and the black sub-frame displayed by the other of the first display region and the second display region, the right-eye sub-frames are displayed by the first display region and the second display region alternately, and one of the right-eye sub-frames displayed by the first display region and a corresponding one of the right-eye sub-frames displayed by the second display region form a right-eye image; and controlling a first backlight and a second backlight of a backlight module to be turned on alternately in such a way that the first backlight illuminates the first display region when the first display region displays one of the left-eye sub-frames and one of the right-eye sub-frames and the second backlight illuminates the second display region when the second display region displays one of the left-eye sub-frames and one of the right-eye sub-frames.

According to a preferred embodiment of the present disclosure, the control method further includes controlling a left-eye glass and a right-eye glass of a pair of shutter glasses to be turned on alternately so as to transmit the left-eye frames and the right-eye frames alternately.

According to a preferred embodiment of the present disclosure, the step of controlling the LCD panel to display the left-eye frames and the right-eye frames alternately includes: controlling the left-eye frames and the right-eye frames to be transmitted to the LCD panel successively through a scanning way, and the step of controlling the first backlight and the second backlight of the backlight module to be turned on alternately includes: controlling the first backlight to be turned on with a delay of a first predetermined time after one of the left-eye sub-frames or one of the right-eye sub-frames has been totally transmitted to the first display region and to be turned off with a delay of the first predetermined time after a next sub-frame adjacent to one of said left-eye sub-frames or one of said right-eye sub-frames has been totally transmitted to the second display region, and controlling the second backlight to be turned on with a delay of a second predetermined time after one of the left-eye sub-frames or one of the right-eye sub-frames has been totally transmitted to the second display region and to be turned off with a delay of the second predetermined time after a next sub-frame adjacent to one of said left-eye sub-frames or one of said right-eye sub-frames has been totally transmitted to the first display region, and the first predetermined time and the second predetermined time range between 2 ms and 6 ms.

According to a preferred embodiment of the present disclosure, the step of controlling the left-eye glass and the right-eye glass of the pair of shutter glasses to be turned on alternately includes: controlling the left-eye glass to be turned on earlier than turning-on of the second backlight by a third predetermined time when the LCD panel displays one of the left-eye frames, and to be turned off earlier than turning-on of the second backlight by the third predetermined time when the LCD panel displays one of the right-eye frames, and controlling the right-eye glass to be turned on earlier than turning-on of the second backlight by a fourth predetermined time when the LCD panel displays one of the right-eye frames, and to be turned off earlier than turning-on of the second backlight by the fourth predetermined time when the LCD panel displays one of the left-eye frames, and the third predetermined time and the fourth predetermined time range between 2 ms and 6 ms.

The present disclosure has the following benefits: as compared to the prior art, the stereoscopic display device and the control method thereof according to the present disclosure control the first display region and the second display region of the LCD panel to display a left-eye/right-eye sub-frame and a black sub-frame alternately, and control the first backlight and the second backlight of the backlight module to illuminate the first display region and the second display region alternately according to the content displayed by the LCD panel. Therefore, when the first backlight is turned on, a black sub-frame is displayed in the lower middle region of the LCD panel, and when the second backlight is turned on, a black sub-frame is also displayed in the upper middle region of the LCD panel. This avoids entry of light into the user's eyes through the middle region, so uniformity in brightness of the frame displayed by the stereoscopic display device is improved.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF THE INVENTION

Figure 1:
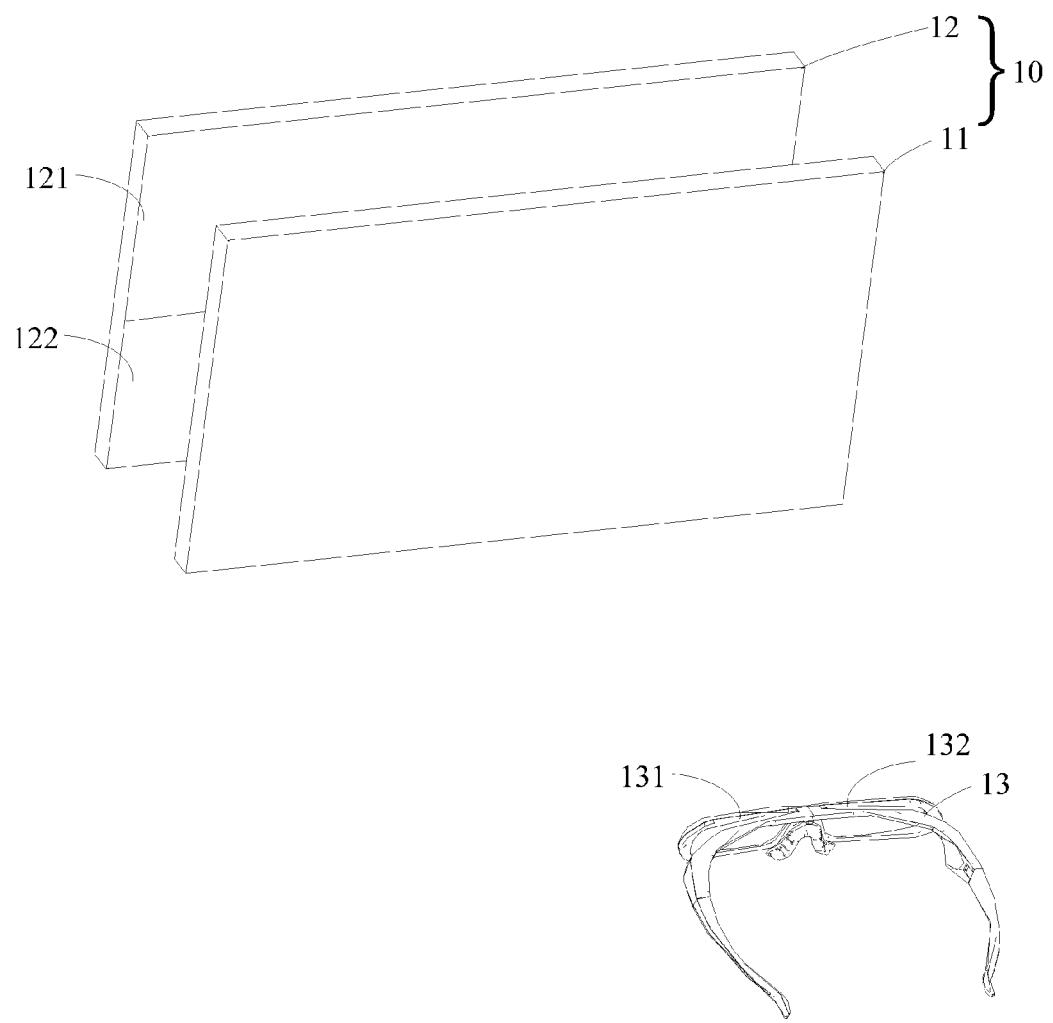
FIG. 1 is a schematic view of a prior art stereoscopic display device.
Figure 2:
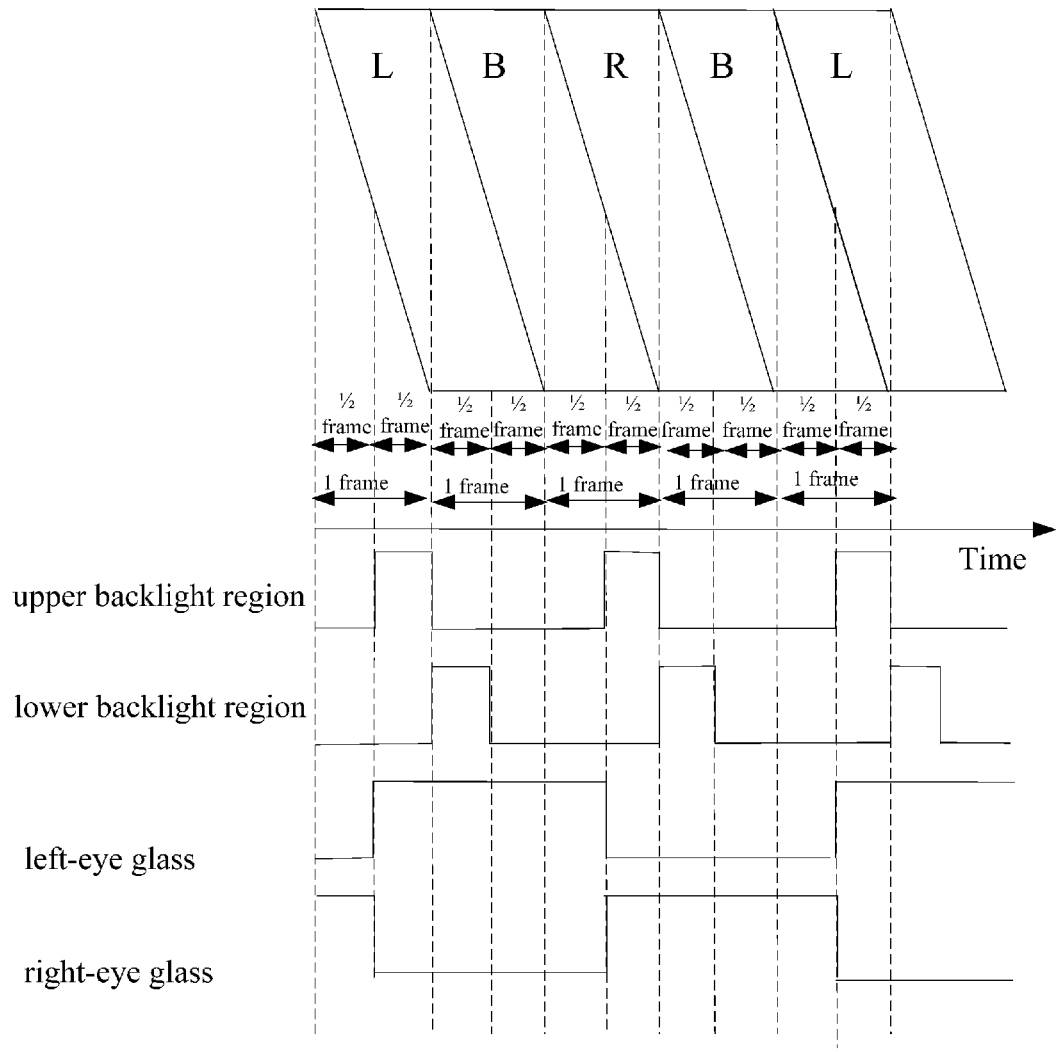
FIG. 2 is an operational timing diagram of the stereoscopic display device shown in FIG. 1.
Figure 3:
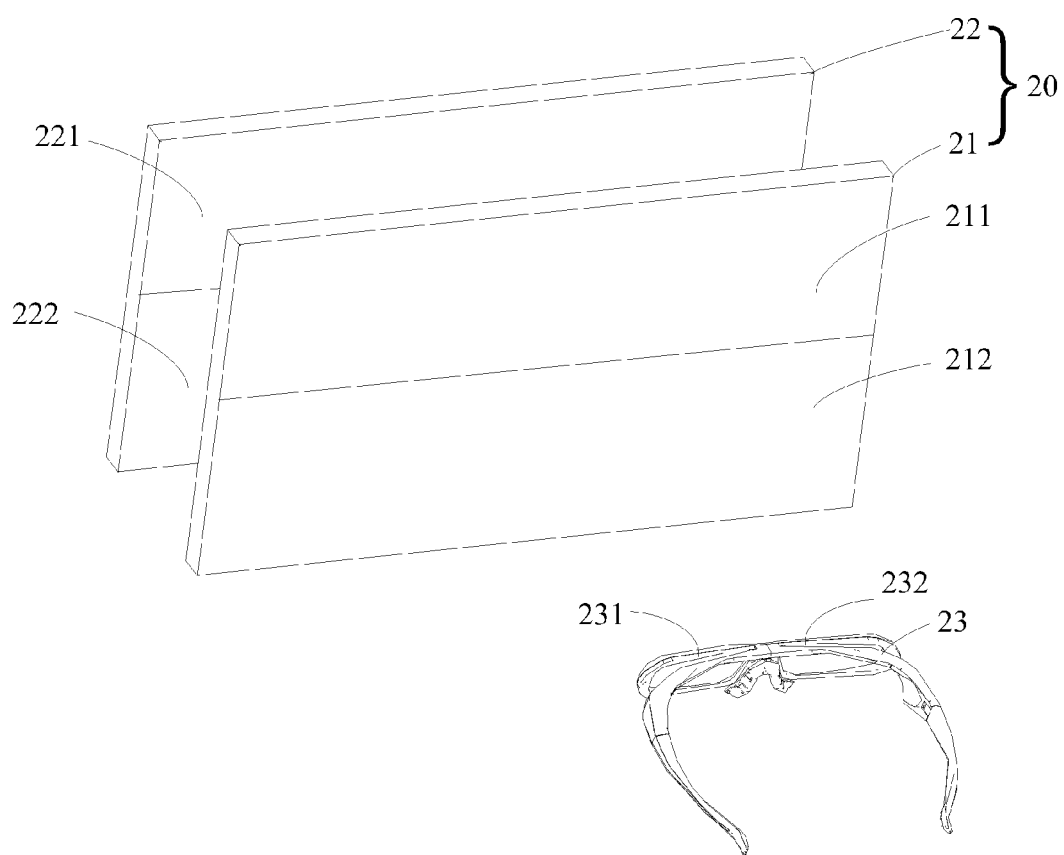
FIG. 3 is a schematic view of a preferred embodiment of a stereoscopic display device according to the present disclosure.

FIG. 3 shows a schematic view of a preferred embodiment of a stereoscopic display device according to the present disclosure. As shown in FIG. 3, the stereoscopic display device of the present disclosure includes an LCD 20 and a pair of shutter glasses 23. The LCD 20 further includes an LCD panel 21 and a backlight module 22. The LCD panel 21 is disposed between the backlight module 22 and the shutter glasses 23, and illuminated by the backlight module 22.

The LCD panel 21 is divided into a first display region 211 and a second display region 212. The backlight module 22 is divided into a first backlight 221 corresponding to the first display region 211 and a second backlight 222 corresponding to the second display region 212. The first backlight 221 and the second backlight 222 are controlled separately by a control circuit (not shown) so that the first backlight 221 and the second backlight 222 can be turned on alternately. In this embodiment, the first display region 211 is an upper half of the LCD panel 21, and the second display region 212 is a lower half of the LCD panel 21. Of course, the first display region 211 and the second display region 212 may also be designed in a different way in other embodiments.

The pair of shutter glasses 23 includes a left-eye glass 231 and a right-eye glass 232, and can be synchronized to the LCD panel 21 through an infrared signal, a Bluetooth signal or some other communication means. The left-eye glass 231 and the right-eye glass 232 can be turned on alternately according to a synchronizing signal generated by the LCD panel 21.

Figure 4:
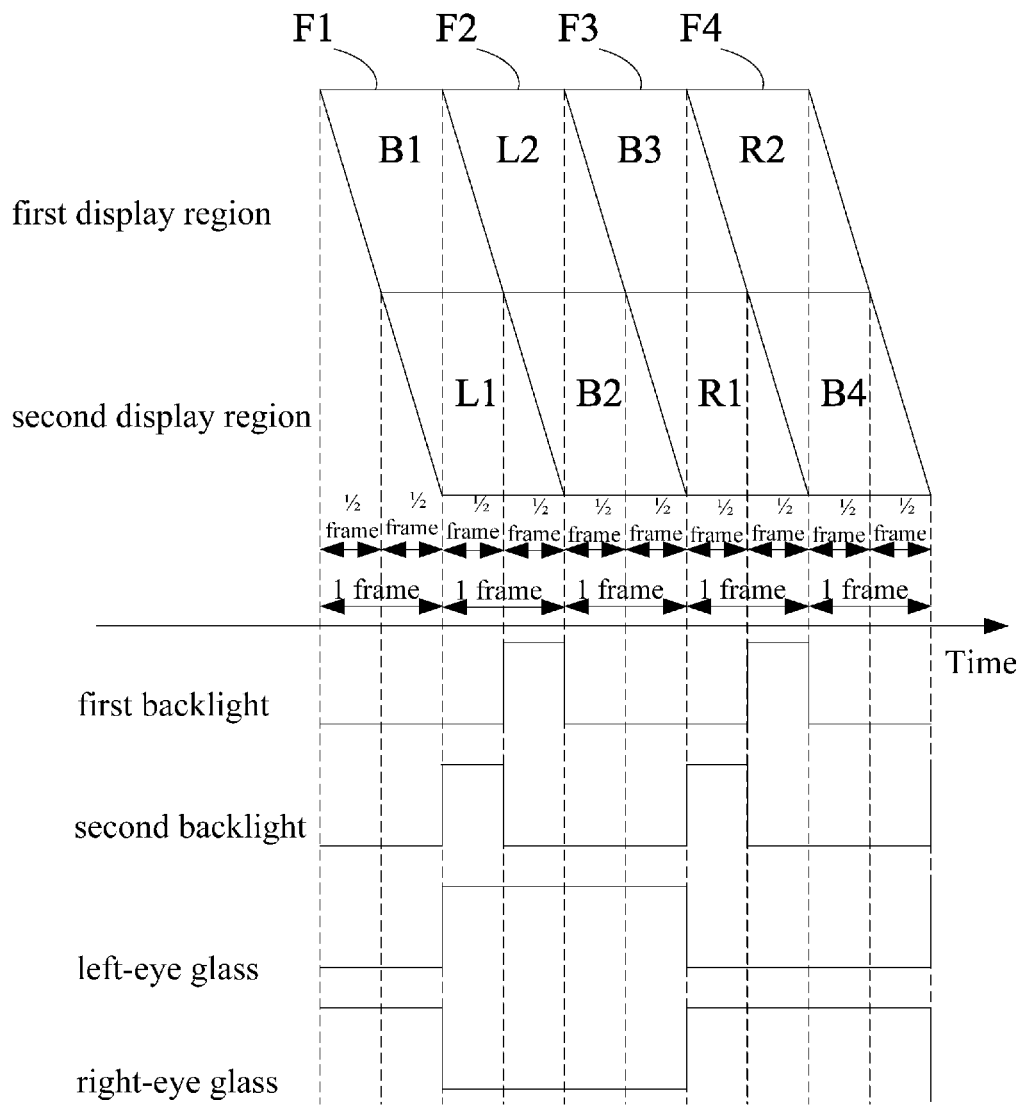
FIG. 4 is an operational timing diagram of the stereoscopic display device shown in FIG. 3.

FIG. 4 shows an operational timing diagram of the stereoscopic display device shown in FIG. 3. As shown in FIG. 4, left-eye frames and right-eye frames are alternately displayed by the LCD panel 21 of this embodiment. Each of the left-eye frames includes a left-eye sub-frame displayed by one of the first display region 211 and the second display region 212 and a black sub-frame displayed by the other of the first display region 211 and the second display region 212. The left-eye sub-frames are displayed by the first display region 211 and the second display region 212 alternately, and one of the left-eye sub-frames displayed by the first display region 211 and a corresponding one of the left-eye sub-frames displayed by the second display region 212 combine to form a left-eye image. Each of the right-eye frames includes a right-eye sub-frame displayed by one of the first display region 211 and the second display region 212 and a black sub-frame displayed by the other of the first display region 211 and the second display region 212. Likewise, the right-eye sub-frames are displayed by the first display region 211 and the second display region 212 alternately, and one of the right-eye sub-frames displayed by the first display region 211 and a corresponding one of the right-eye sub-frames displayed by the second display region 212 combine to form a right-eye image.

In this embodiment, the left-eye frames include a first left-eye frame F1 and a second left-eye frame F2. The first left-eye frame F1 includes a black sub-frame B1 displayed by the first display region 211 and a left-eye sub-frame L1 displayed by the second display region 212, and the second left-eye frame F2 includes a left-eye sub-frame L2 displayed by the first display region 211 and a black sub-frame B2 displayed by the second display region 212. The left-eye sub-frame L2 displayed by the first display region 211 and the left-eye sub-frame L1 displayed by the second display region 212 combine to form a left-eye image. The right-eye frames include a first right-eye frame F3 and a second right-eye frame F4. The first right-eye frame F3 includes a black sub-frame B3 displayed by the first display region 211 and a right-eye sub-frame R1 displayed by the second display region 212, and the second right-eye frame F4 includes a right-eye sub-frame R2 displayed by the first display region 211 and a black sub-frame B2 displayed by the second display region 212. The right-eye sub-frame R2 displayed by the first display region 211 and the right-eye sub-frame R1 displayed by the second display region 212 combine to form a right-eye image.

The first backlight 221 and the second backlight 222 of the backlight module 22 are turned on alternately in such a way that, the first backlight 221 illuminates the first display region 211 when either of the left-eye sub-frame L2 and the right-eye sub-frame R2 is displayed in the first display region 211, and the second backlight 222 illuminates the second display region 212 when either of the left-eye sub-frame L1 and the right-eye sub-frame R1 is displayed in the second display region 212. In this embodiment, the left-eye frames and the right-eye frames are transmitted to the LCD panel 21 successively through a scanning way similar to that of a conventional LCD, so this will not be further described herein. The second backlight 222 is turned on when image data of the left-eye sub-frame L1 or the right-eye sub-frame R1 has been totally transmitted to the second display region 212, and is turned off when image data of a next sub-frame adjacent to one of the left-eye sub-frames or one of the right-eye sub-frames (i.e., the left-eye sub-frame L2 or the right-eye sub-frame R2) has been totally transmitted to the first display region 211. A duration in which the second backlight 222 is turned on is equal to a half of a frame. The first backlight 221 is turned on when image data of the left-eye sub-frame L2 or the right-eye sub-frame R3 has been totally transmitted to the first display region 211, and is turned off when image data of a next sub-frame adjacent to one of said left-eye sub-frames or one of said right-eye sub-frames (i.e., the black sub-frame B2 or B4) has been totally transmitted to the second display region 211. A duration in which the second backlight 221 is turned on is also equal to a half of a frame.

The left-eye glass 231 and the right-eye glass 232 of the pair of shutter glasses 23 are turned on alternately according to the content displayed by the LCD panel 211 so that the left-eye frames and the right-eye frames are transmitted through the left-eye glass 231 and the right-eye glass 232 alternately. In this embodiment, the left-eye glass 231 is turned on when the LCD panel 21 displays the first left-eye frame F1 and the second backlight 222 is turned on, and is turned off when the LCD panel 21 displays the first right-eye frame F3 and the second backlight 222 is turned on; thus, the first left-eye frame F1 and the second left-eye frame F2 are transmitted to the user's left eye. The left-eye glass 231 is turned on for two frames. At this point, the left-eye sub-frame L1 of the first left-eye frame F1 and the left-eye sub-frame L2 of the second left-eye frame F2 combine to form a complete left-eye image in the user's brain. The right-eye glass 232 is turned on when the LCD panel 21 displays the first right-eye frame F3 and the second backlight 222 is turned on, and is turned off when the LCD panel 21 displays the first left-eye frame L1 and the second backlight 222 is turned on. Thus, the first right-eye frame F3 and the second right-eye frame F4 are transmitted to the user's right eye. The right-eye glass 232 is turned on also for two frames but alternately with the left-eye glass 231. At this point, the right-eye sub-frame R1 of the first right-eye frame F3 and the right-eye sub-frame R2 of the second right-eye frame F4 combine to form a complete right-eye image in the user's brain. As the left-eye glass 231 and the right-eye glass 232 are turned on alternately, a stereoscopic image is formed in the user's brain by the left-eye frame and the right-eye frame received by the user's left eye and right eye alternately, thus resulting in a stereoscopic displaying effect.

In this embodiment, the orders in which the first left-eye frame F1, the second left-eye frame F2, the first right-eye frame F3 and the second right-eye frame F4 are displayed can be exchanged. For example, the order in which the first left-eye frame F1 and the second left-eye frame F2 are displayed can be exchanged, and the order in which the first right-eye frame F3 and the second left-eye frame F4 are displayed may also be exchanged. In this case, time points at which the backlights 221, 222 are turned on and off and time points at which the left and the right-eye glasses 231, 232 are turned on and off shall be changed correspondingly. In other embodiments, the way in which the first left-eye frame F1, the second left-eye frame F2, the first right-eye frame F3 and the second right-eye frame F4 are displayed may be further varied. For example, each of the first left-eye frame F1, the second left-eye frame F2, the first right-eye frame F3 and the second right-eye frame F4 may be displayed for a duration of several frames continuously before the displaying is switched to one of the other frames.

In the way described above, the first display region 211 and the second display region 212 of the LCD panel 21 are controlled to display the left-eye/right-eye sub-frames and the black sub-frames alternately, and the first backlight 221 and the second backlight 222 of the backlight module 22 are controlled to illuminate the first display region 211 and the second display region 212 alternately according to the content displayed by the LCD panel 21. When the first backlight 221 is turned on, a black sub-frame is displayed in a lower middle region of the LCD panel 21, and when the second backlight 222 is turned on, a black sub-frame is also displayed in an upper middle region of the LCD panel 21. This avoids entry of light into the user's eyes through the middle region, so uniformity in brightness of the frame displayed by the stereoscopic display device is improved.

Figure 5:
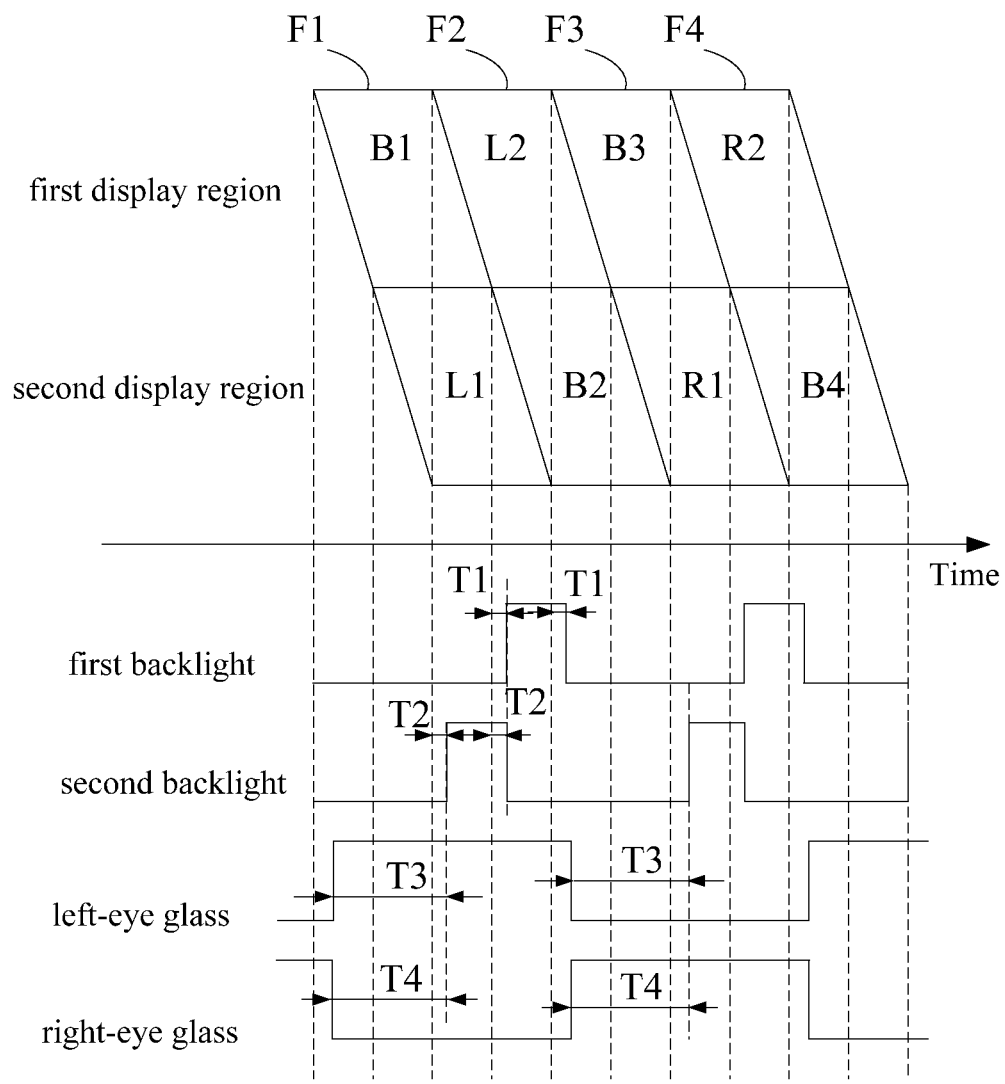
FIG. 5 is another operational timing diagram of the stereoscopic display device shown in FIG. 3.

FIG. 5 shows another operational timing diagram of the stereoscopic display device shown in FIG. 3. As shown in FIG. 5, the operational timing diagram of this embodiment differs from that of FIG. 4 in that: the first backlight 221 is turned on with a delay of a first predetermined time T1 after image data of the left-eye sub-frame L2 or the right-eye sub-frame R2 has been totally transmitted to the first display region 211, and the second backlight 222 is turned on with a delay of a second predetermined time T2 after image data of the left-eye sub-frame L1 or the right-eye sub-frame R1 has been totally transmitted to the second display region 212. Correspondingly, the first backlight 221 and the second backlight 222 are also turned off with a delay of the first predetermined time T1 and the second predetermined time T2 respectively. The first predetermined time T1 and the second predetermined time T2 range between 2 milliseconds (ms) and 6 ms. In this way, the problem of poor uniformity in transmissivity caused by delay in response of the LCD panel 21 can be effectively avoided.

Additionally, the left-eye glass 231 of the pair of shutter glasses 23 is turned on earlier than turning-on of the second backlight 222 by a third predetermined time T3 when the LCD panel 21 displays a left-eye frame, and the right-eye glass 232 is turned on earlier than turning-on of the second backlight 222 by a fourth predetermined time T4 when the LCD panel 21 displays a right-eye frame. Correspondingly, turning-off of the left-eye glass 231 and the right-eye glass 232 is also earlier by the third predetermined time T3 and the fourth predetermined time T4 respectively. The third predetermined time T3 and the fourth predetermined time T4 range between 2 ms and 6 ms. In this way, the problem of poor uniformity in transmissivity caused by delay in response of the shutter glasses 23 can be effectively avoided.

Figure 6:
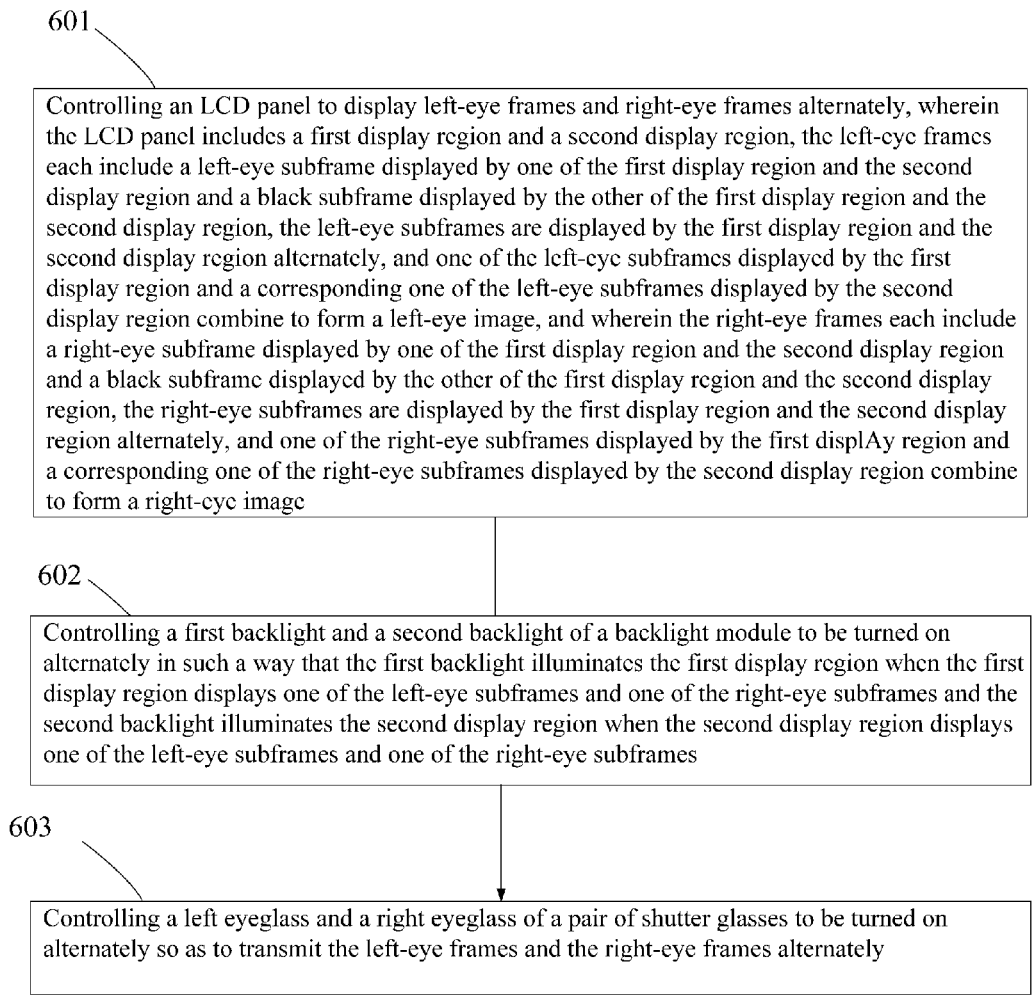
FIG. 6 is a flowchart of a control method of the stereoscopic display device shown in FIG. 3.

FIG. 6 shows a flowchart of a control method of the stereoscopic display device shown in FIG. 3. As shown in FIG. 6, the control method includes the following steps:

Step 601: controlling the LCD panel 21 to display left-eye frames and right-eye frames alternately. The LCD panel 21 includes a first display region 211 and a second display region 212. Each of the left-eye frames includes a left-eye sub-frame displayed by one of the first display region 211 and the second display region 212 and a black sub-frame displayed by the other of the first display region 211 and the second display region 212. The first display region 211 and the second display region 212 display the left-eye sub-frames alternately, and one of the left-eye sub-frames displayed by the first display region 211 and a corresponding one of the left-eye sub-frames displayed by the second display region 212 combine to form a left-eye image. Each of the right-eye frames includes a right-eye sub-frame displayed by one of the first display region 211 and the second display region 212 and a black sub-frame displayed by the other of the first display region 211 and the second display region 212. Likewise, the first display region 211 and the second display region 212 display the right-eye sub-frames alternately, and one of the right-eye sub-frames displayed by the first display region 211 and a corresponding one of the right-eye sub-frames displayed by the second display region 212 combine to form a right-eye image.

Step 602: controlling the first backlight 221 and the second backlight 222 of the backlight module 22 to be turned on alternately in such a way that the first backlight 221 illuminates the first display region 211 when the first display region 211 displays either of the left-eye sub-frame and the right-eye sub-frame and the second backlight 222 illuminates the second display region 212 when the second display region displays either of the left-eye sub-frame and the right-eye sub-frame, as shown in FIG. 4 and FIG. 5.

Step 603: controlling the left-eye glass 231 and the right-eye glass 232 of the pair of shutter glasses 23 to be turned on alternately so that the left-eye frames and the right-eye frames are transmitted alternately.

For technical details of these steps, reference may be made to what detailed above and will not be described again herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A stereoscopic display device, comprising:
   a liquid crystal display (LCD) panel configured to display left-eye frames and right-eye frames alternately, wherein the LCD panel comprises a first display region and a second display region, the left-eye frames each comprise a left-eye sub-frame displayed by one of the first display region and the second display region and a black sub-frame displayed by the other of the first display region and the second display region, the left-eye sub-frames are displayed by the first display region and the second display region alternately, and one of the left-eye sub-frames displayed by the first display region and a corresponding one of the left-eye sub-frames displayed by the second display region combine to form a left-eye image, and wherein the right-eye frames each comprise a right-eye sub-frame displayed by one of the first display region and the second display region and a black sub-frame displayed by the other of the first display region and the second display region, the right-eye sub-frames are displayed by the first display region and the second display region alternately, and one of the right-eye sub-frames displayed by the first display region and a corresponding one of the right-eye sub-frames displayed by the second display region combine to form a right-eye image;

a backlight module comprising a first backlight and a second backlight, wherein the first backlight and the second backlight are turned on alternately in such a way that the first backlight illuminates the first display region when the first display region displays one of the left-eye sub-frames and one of the right-eye sub-frames and the second backlight illuminates the second display region when the second display region displays one of the left-eye sub-frames and one of the right-eye sub-frames; and a pair of shutter glasses comprising a left-eye glass and a right-eye glass, wherein the left-eye glass and the right-eye glass are turned on alternately to transmit the left-eye frames and the right-eye frames alternately;

wherein the left-eye frames comprise a first left-eye frame and a second left-eye frame, the first left-eye frame comprises the black sub-frame displayed by the first display region and the left-eye sub-frame displayed by the second display region, the second left-eye frame comprises the left-eye sub-frame displayed by the first display region and the black sub-frame displayed by the second display region, the right-eye frames comprise a first right-eye frame and a second right-eye frame, the first right-eye frame comprises the black sub-frame displayed by the first display region and the right-eye sub-frame displayed by the second display region, and the second right-eye frame comprises the right-eye sub-frame displayed by the first display region and the black sub-frame displayed by the second display region.

2. The stereoscopic display device of claim 1, wherein the left-eye frames and the right-eye frames are transmitted to the LCD panel successively through a scanning way, the first backlight is turned on with a delay of a first predetermined time after one of the left-eye sub-frames or one of the right-eye sub-frames has been totally transmitted to the first display region, and is turned off with a delay of the first predetermined time after a next sub-frame adjacent to one of said left-eye sub-frames or one of said right-eye sub-frames has been totally transmitted to the second display region, the second backlight is turned on with a delay of a second predetermined time after one of the left-eye sub-frames or one of the right-eye sub-frames has been totally transmitted to the second display region, and is turned off with a delay of the second predetermined time after a next sub-frame adjacent to one of said left-eye sub-frames or one of said right-eye sub-frames has been totally transmitted to the first display region, and the first predetermined time and the second predetermined time range between 2 milliseconds (ms) and 6 ms.

3. A stereoscopic display device, comprising:

an LCD panel configured to display left-eye frames and right-eye frames alternately, wherein the LCD panel comprises a first display region and a second display region, the left-eye frames each comprise a left-eye sub-frame displayed by one of the first display region and the second display region and a black sub-frame displayed by the other of the first display region and the second display region, the left-eye sub-frames are displayed by the first display region and the second display region alternately, and one of the left-eye sub-frames displayed by the first display region and a corresponding one of the left-eye sub-frames displayed by the second display region combine to form a left-eye image, and wherein the right-eye frames each comprise a right-eye sub-frame displayed by one of the first display region and the second display region and a black sub-frame displayed by the other of the first display region and the second display region, the right-eye sub-frames are displayed by the first display region and the second display region alternately, and one of the right-eye sub-frames displayed by the first display region and a corresponding one of the right-eye sub-frames displayed by the second display region combine to form a right-eye image; and a backlight module comprising a first backlight and a second backlight, wherein the first backlight and the second backlight are turned on alternately in such a way that the first backlight illuminates the first display region when the first display region displays one of the left-eye sub-frames and one of the right-eye sub-frames and the second backlight illuminates the second display region when the second display region displays one of the left-eye sub-frames and one of the right-eye sub-frames.

4. The stereoscopic display device of claim 3, wherein the left-eye frames and the right-eye frames are transmitted to the LCD panel successively through a scanning way, the first backlight is turned on when one of the left-eye sub-frames or one of the right-eye sub-frames has been totally transmitted to the first display region, and is turned off when a next sub-frame adjacent to one of said left-eye sub-frames or one of said right-eye sub-frames has been totally transmitted to the second display region, and the second backlight is turned on when one of the left-eye sub-frames or one of the right-eye sub-frames has been totally transmitted to the second display region, and is turned off when a next sub-frame adjacent to one of said left-eye sub-frames or one of said right-eye sub-frames has been totally transmitted to the first display region.

5. The stereoscopic display device of claim 3, wherein the left-eye frames and the right-eye frames are transmitted to the LCD panel successively through a scanning way, the first backlight is turned on with a delay of a first predetermined time after one of the left-eye sub-frames or one of the right-eye sub-frames has been totally transmitted to the first display region, and is turned off with a delay of the first predetermined time after a next sub-frame adjacent to one of said left-eye sub-frames or one of said right-eye sub-frames has been totally transmitted to the second display region, the second backlight is turned on with a delay of a second predetermined time after one of the left-eye sub-frames or one of the right-eye sub-frames has been totally transmitted to the second display region, and is turned off with a delay of the second predetermined time after a next sub-frame adjacent to one of said left-eye sub-frames or one of said right-eye sub-frames has been totally transmitted to the first display region, and the first predetermined time and the second predetermined time range between 2 ms and 6 ms.

6. The stereoscopic display device of claim 3, further comprising a pair of shutter glasses comprising a left-eye glass and a right-eye glass, wherein the left-eye glass and the right-eye glass are turned on alternately to transmit the left-eye frames and the right-eye frames alternately.

7. The stereoscopic display device of claim 6, wherein the left-eye glass is turned on when the LCD panel displays one of the left-eye frames and the second backlight is turned on, and is turned off when the LCD panel displays one of the right-eye frames and the second backlight is turned on, and the right-eye glass is turned on when the LCD panel displays one of the right-eye frames and the second backlight is turned on, and is turned off when the LCD panel displays one of the left-eye frames and the second backlight is turned on.

8. The stereoscopic display device of claim 3, wherein the left-eye frames comprise a first left-eye frame and a second left-eye frame, the first left-eye frame comprises the black sub-frame displayed by the first display region and the left-eye sub-frame displayed by the second display region, the second left-eye frame comprises the left-eye sub-frame displayed by the first display region and the black sub-frame displayed by the second display region, the right-eye frames comprise a first right-eye frame and a second right-eye frame, the first right-eye frame comprises the black sub-frame displayed by the first display region and the right-eye sub-frame displayed by the second display region, and the second right-eye frame comprises the right-eye sub-frame displayed by the first display region and the black sub-frame displayed by the second display region.

9. A control method of a stereoscopic display device, comprising the following steps of:
controlling an LCD panel to display left-eye frames and right-eye frames alternately, wherein the LCD panel comprises a first display region and a second display region, the left-eye frames each comprise a left-eye sub-frame displayed by one of the first display region and the second display region and a black sub-frame displayed by the other of the first display region and the second display region, the left-eye sub-frames are displayed by the first display region and the second display region alternately, and one of the left-eye sub-frames displayed by the first display region and a corresponding one of the left-eye sub-frames displayed by the second display region combine to form a left-eye image, and wherein the right-eye frames each comprise a right-eye sub-frame displayed by one of the first display region and the second display region and a black sub-frame displayed by the other of the first display region and the second display region, the right-eye sub-frames are displayed by the first display region and the second display region alternately, and one of the right-eye sub-frames displayed by the first display region and a corresponding one of the right-eye sub-frames displayed by the second display region combine to form a right-eye image; and
controlling a first backlight and a second backlight of a backlight module to be turned on alternately in such a way that the first backlight illuminates the first display region when the first display region displays one of the left-eye sub-frames and one of the right-eye sub-frames and the second backlight illuminates the second display region when the second display region displays one of the left-eye sub-frames and one of the right-eye sub-frames.

10. The control method of claim 9, further comprising: controlling a left-eye glass and a right-eye glass of a pair of shutter glasses to be turned on alternately so as to transmit the left-eye frames and the right-eye frames alternately.

11. The control method of claim 10, wherein the step of controlling the LCD panel to display the left-eye frames and the right-eye frames alternately comprises:
controlling the left-eye frames and the right-eye frames to be transmitted to the LCD panel successively through a scanning way; and
the step of controlling the first backlight and the second backlight of the backlight module to be turned on alternately comprises:
controlling the first backlight to be turned on with a delay of a first predetermined time after one of the left-eye sub-frames or one of the right-eye sub-frames has been totally transmitted to the first display region and to be turned off with a delay of the first predetermined time after a next sub-frame adjacent to one of said left-eye sub-frames or one of said right-eye sub-frames has been totally transmitted to the second display region, and controlling the second backlight to be turned on with a delay of a second predetermined time after one of the left-eye sub-frames or one of the right-eye sub-frames has been totally transmitted to the second display region and to be turned off with a delay of the second predetermined time after a next sub-frame adjacent to one of said left-eye sub-frames or one of said right-eye sub-frames has been totally transmitted to the first display region, and the first predetermined time and the second predetermined time range between 2 ms and 6 ms.

12. The control method of claim 10, wherein the step of controlling the left-eye glass and the right-eye glass of the pair of shutter glasses to be turned on alternately comprises:
controlling the left-eye glass to be turned on earlier than turning-on of the second backlight by a third predetermined time when the LCD panel displays one of the left-eye frames, and to be turned off earlier than turning-on of the second backlight by the third predetermined time when the LCD panel displays one of the right-eye frames, and controlling the right-eye glass to be turned on earlier than turning-on of the second backlight by a fourth predetermined time when the LCD panel displays one of the right-eye frames, and to be turned off earlier than turning-on of the second backlight by the fourth predetermined time when the LCD panel displays one of the left-eye frames, and the third predetermined time and the fourth predetermined time range between 2 ms and 6 ms.

* * * * *